June 19, 1951
C. G. LUCENTI
MACHINE FOR APPLYING ADHESIVE
TAPE TO THE EDGES OF ARTICLES
2,557,831
Filed Nov. 22, 1948
8 Sheets—Sheet 6
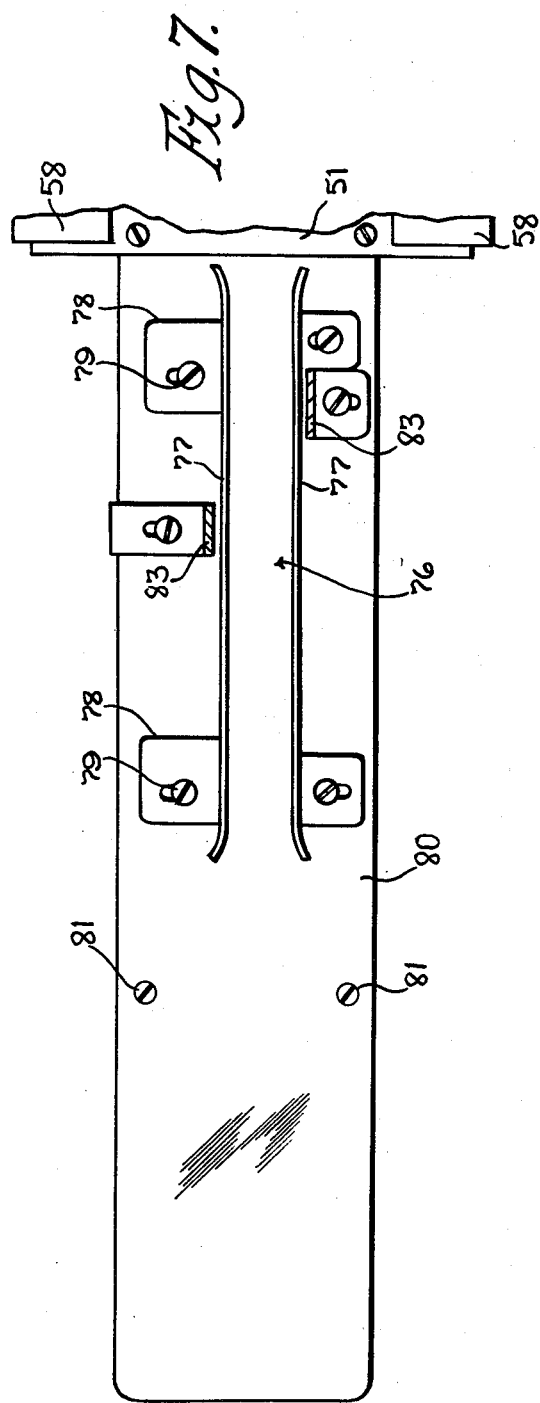
INVENTOR.
Charles G. Lucenti
BY Clarence E. Threedy
His Attorney.

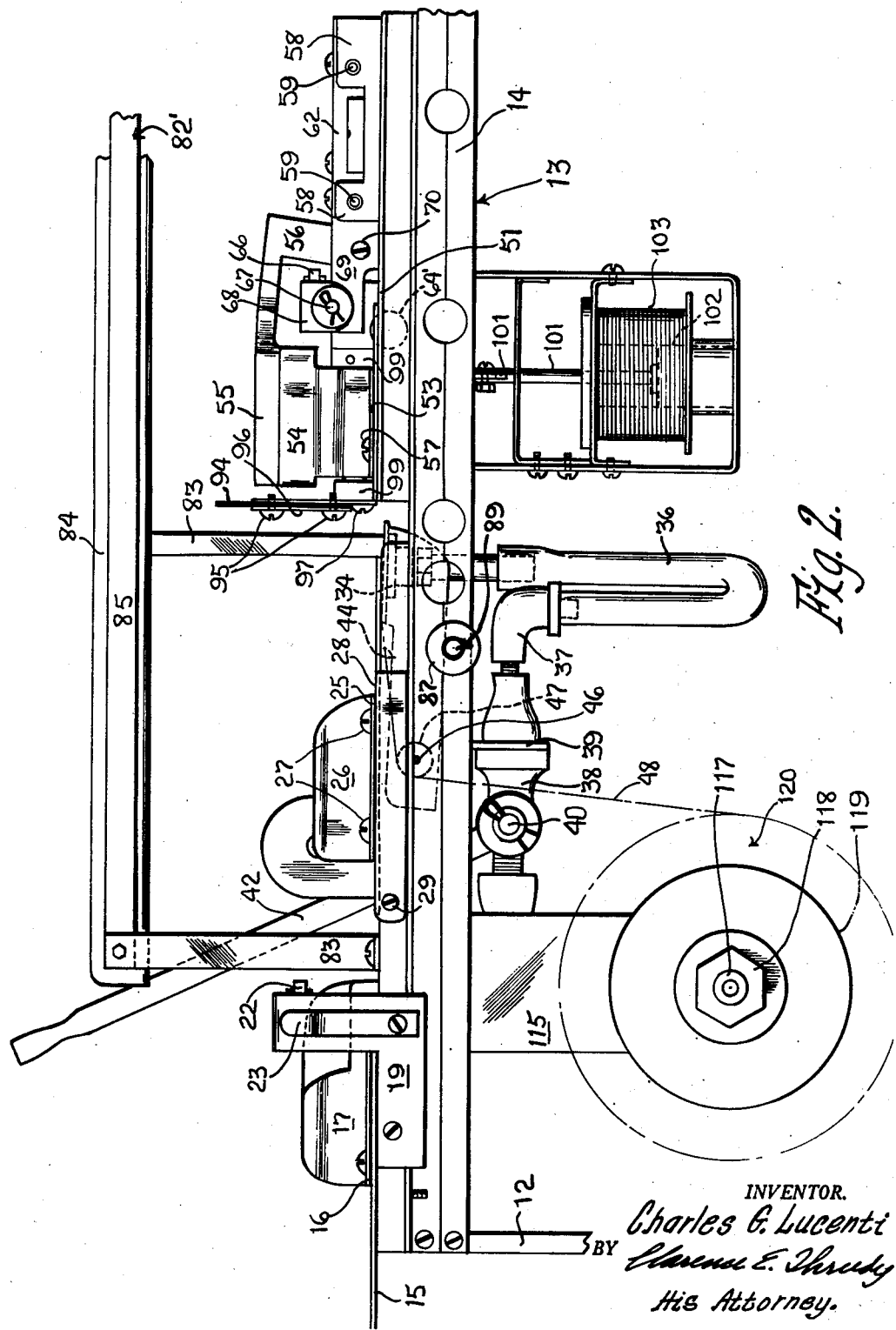

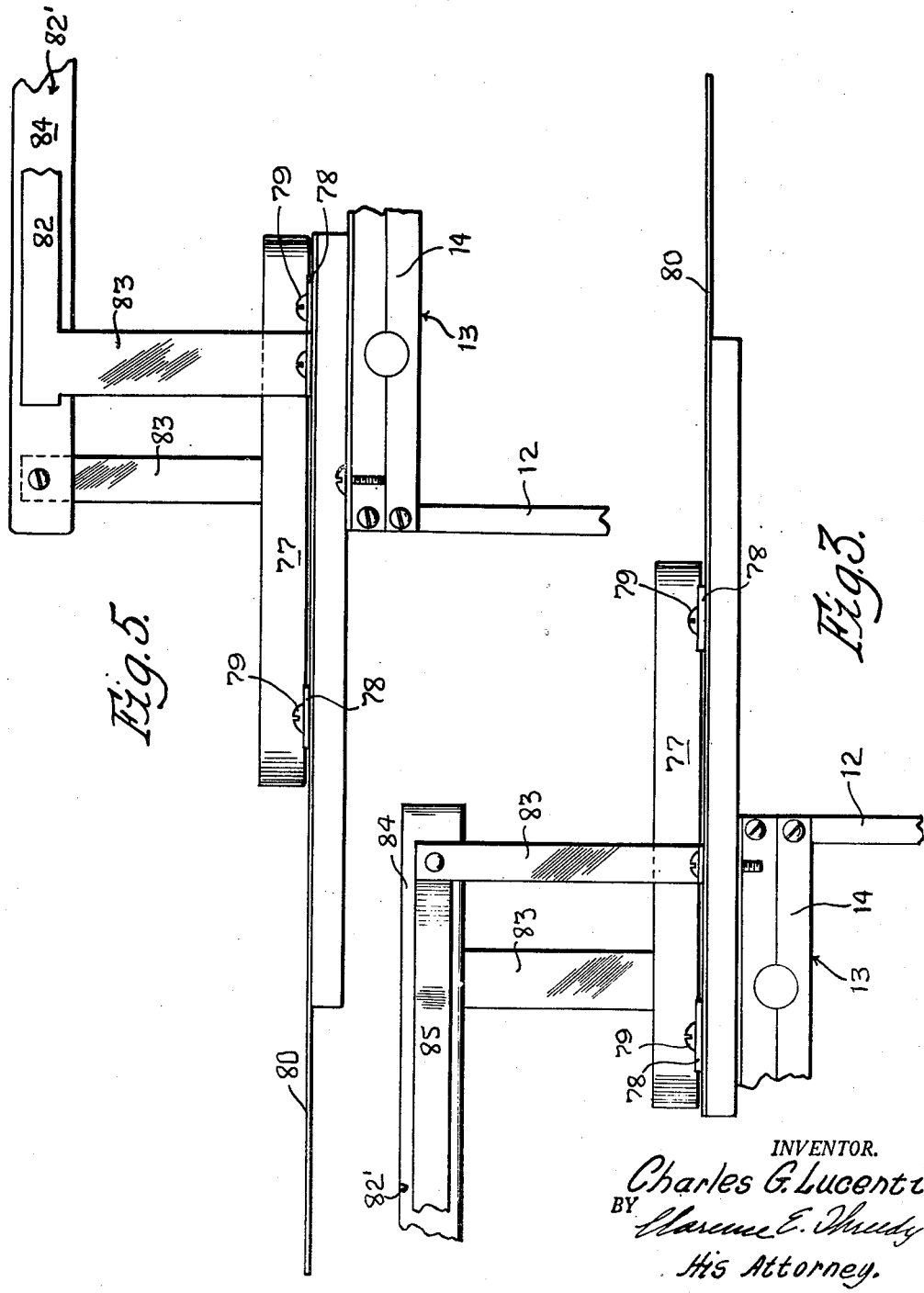

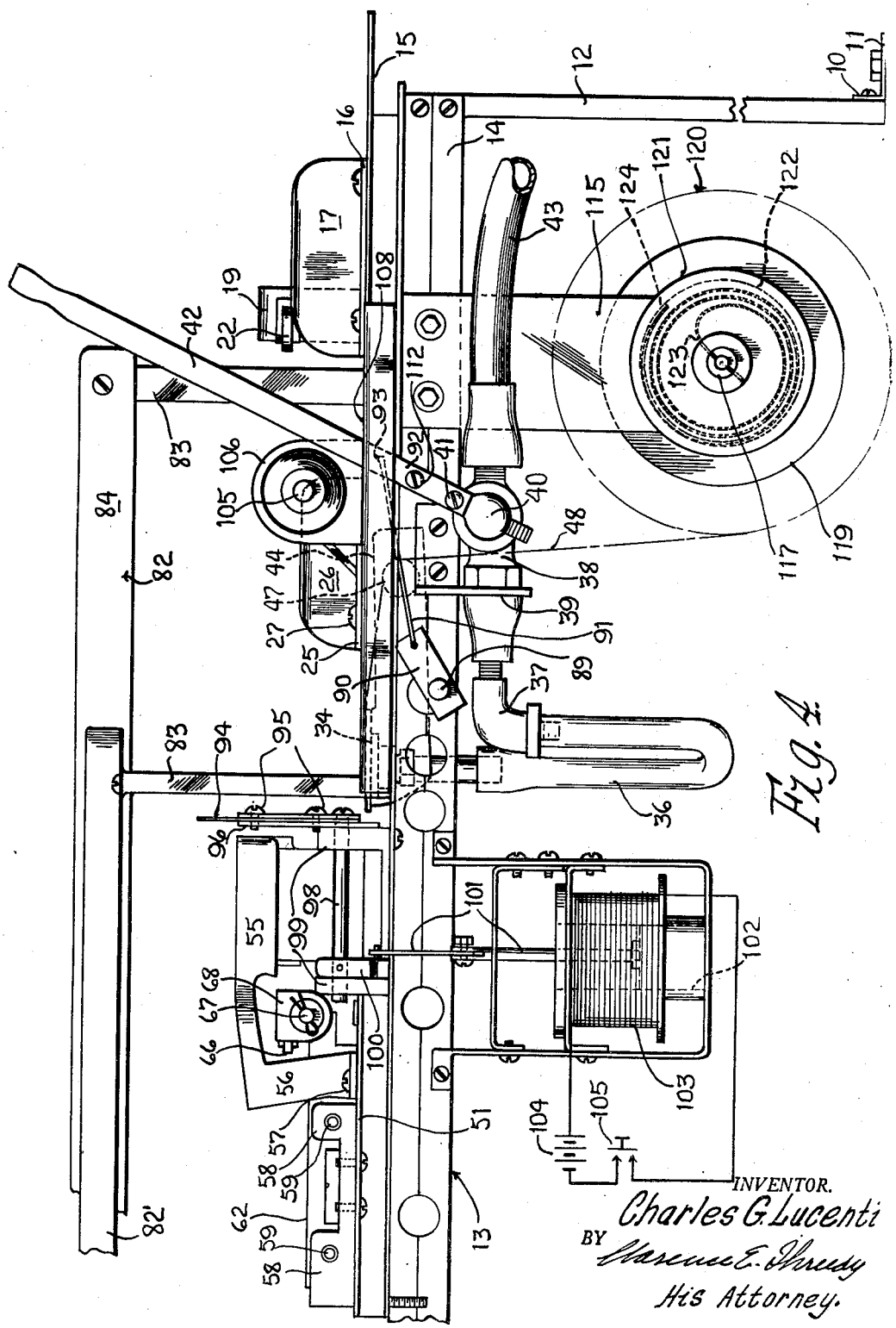

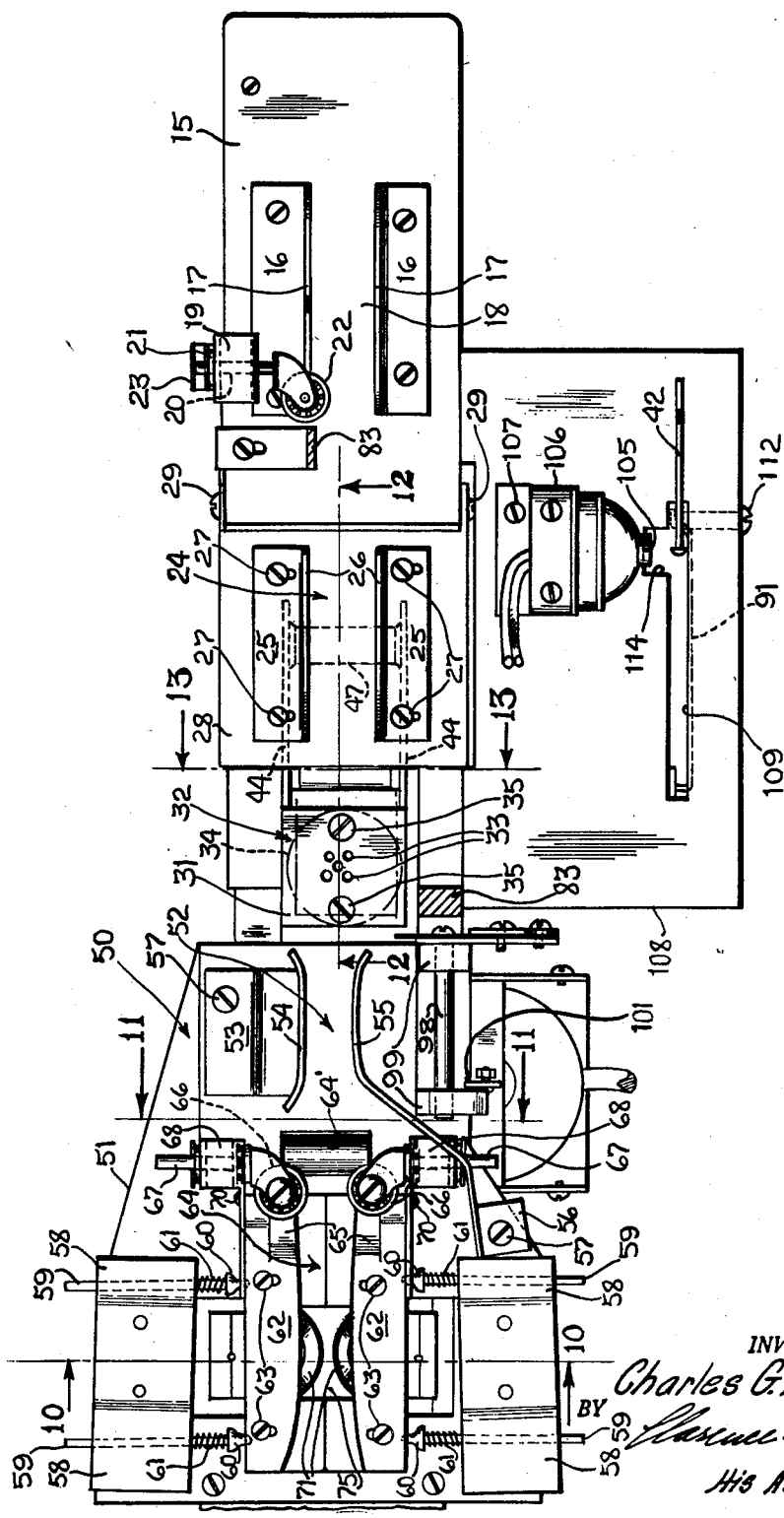

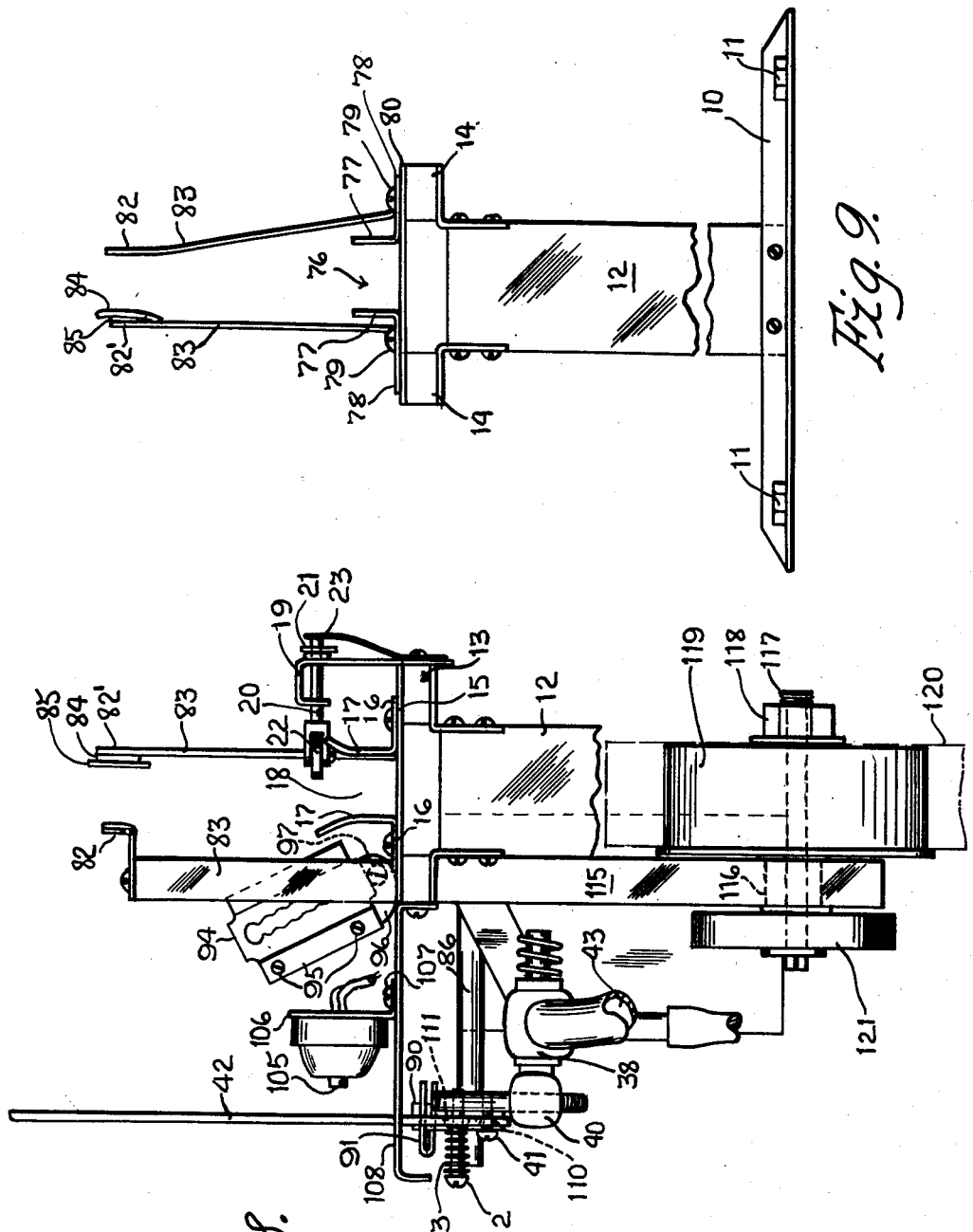

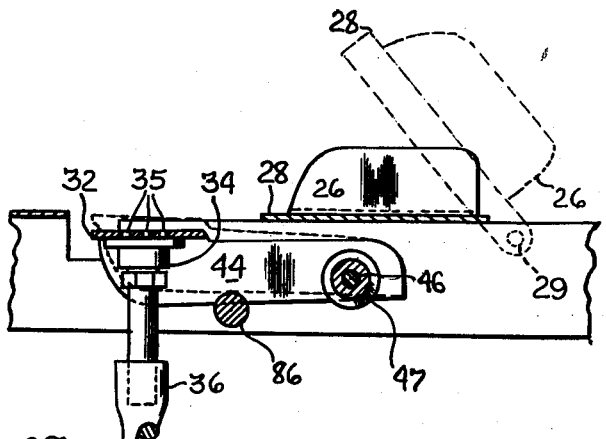
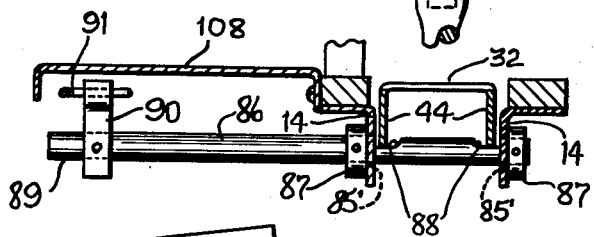
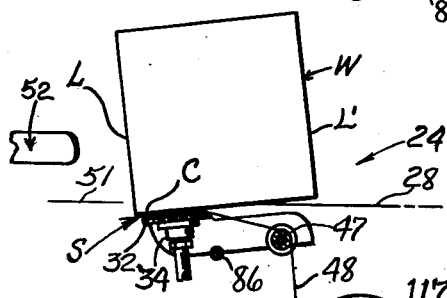
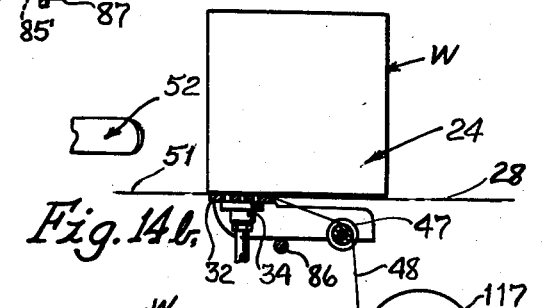
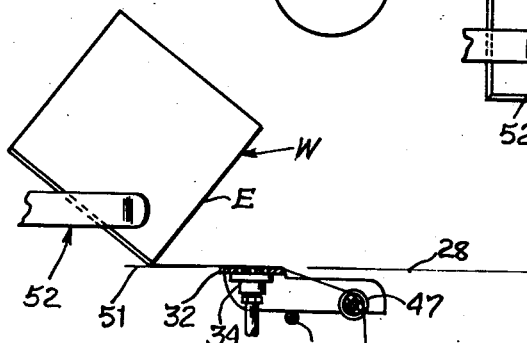
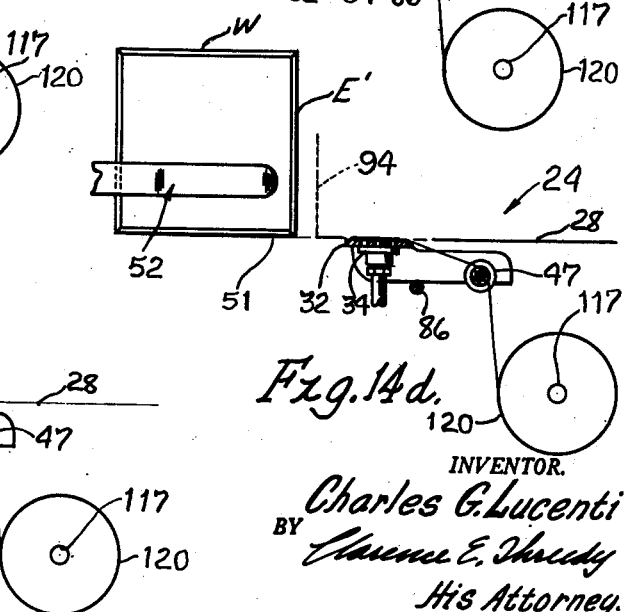

Patented June 19, 1951

2,557,831

UNITED STATES PATENT OFFICE 2,557,831

MACHINE FOR APPLYING ADHESIVE TAPE TO THE EDGES OF ARTICLES

Charles G. Lucenti, Chicago, Ill.

Application November 22, 1948, Serial No. 61,403

16 Claims. (Cl. 154—1.8)

This invention relates to a machine for applying adhesive tape to the edges of an article, such for example, game boards, box covers, pictures, and many other articles of manufacture too numerous to mention.

Heretofore it was the practice to tape the edges of such articles by hand. Such practice was not only tedious but also extremely slow and laborious. My invention has for its principal object the provision of an apparatus for mechanically applying the tape to the edge of such articles. The accomplishment of this object results in increased volume of production and reduces to the minimum the efforts on the part of the operator in accomplishing the taping operation.

Another object of the invention is the provision of an apparatus of this character which will be highly efficient in use and economical in manufacture.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 2 is a fragmentary left-hand side view of the invention as viewed in Fig. 1;

Fig. 3 is a fragmentary right-hand side view of the invention as viewed in Fig. 1;

Fig. 4 is a fragmentary view of the opposite side of the invention as viewed in Fig. 2;

Fig. 5 is a fragmentary view of the opposite side of the invention as viewed in Fig. 3;

Fig. 6 is a top plan view of the invention as viewed in Fig. 4;

Fig. 7 is a fragmentary top plan view of the invention as viewed in Fig. 5;

Fig. 8 is a left-hand end view of the invention as viewed in Fig. 1;

Fig. 9 is a right-hand end view of the invention as viewed in Fig. 1;

Fig. 10 is a sectional detail view taken substantially on line 10—10 of Fig. 6;

Fig. 11 is a sectional detail view taken substantially on line 11—11 of Fig. 6;

Fig. 12 is a fragmentary sectional detail view taken substantially on line 12—12 of Fig. 6;

Fig. 13 is a sectional detail view taken substantially on line 13—13 of Fig. 6; and Figs. 14A to 14D inclusive are schematic views of the various positions of the work, the edges of which are being taped.

Figure 1:
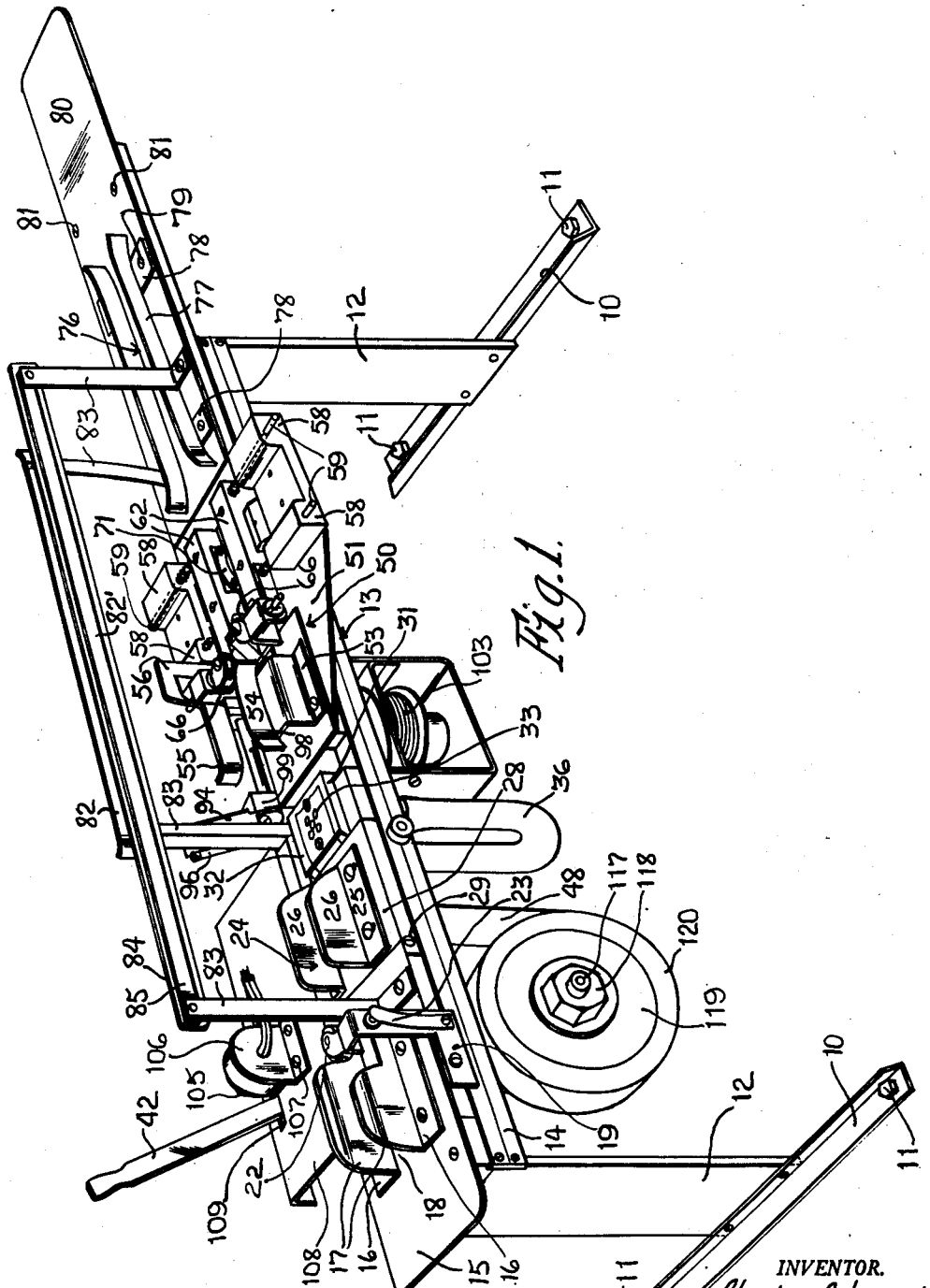
Fig. 1 is a perspective view of the invention.

Referring more particularly to the drawings, in which the preferred form of construction of my invention is shown, there are provided spaced attaching feet 10 by which the apparatus may be firmly secured to a work table (not shown) by means of bolts 11. Secured to and extending upwardly from these feet 10 are legs 12 to which the bed 13 is connected. This bed 13 comprises side rails 14 to which is attached at one end thereof a plate 15. This plate 15 has secured thereto guide plates 16 providing upstanding guide walls 17 which, together, provide a channel 18 through which the edge portion of the work to be taped is adapted to be moved.

Extending upwardly from one of the side rails 14 adjacent the channel 18 provided by the walls 17, is a bracket structure 19. Journalled in the upper end portion of this bracket 19 is a stud shaft 20 having mounted thereon a retaining washer 21. This stud shaft 20 carries a roller 22 located above but in the plane of the channel 18. A leaf spring 23 connected to this bracket structure 19, bears against the end portion of the stud shaft 20 to project the same in the path of movement of the work. As the work is moved through the channel 18, the roller 22 will yieldably engage the adjacent side of the work so as to properly guide the work for entrance into the next channel now to be described.

Such channel is indicated at 24. It is provided by parallelly spaced L-shaped plates 25, the vertical walls 26 of which define the channel 24. These plates 25, by means of slot and screw connections 27, are connected for adjustment laterally of each other upon a plate 28. This plate 28 is pivotally connected as at 29 to the adjacent side rails 14 whereby the plate 28 may be pivoted to the position shown in dotted lines (Fig. 12) to permit free access to be had between the rails 14 at this point for the purpose of feeding the web of tape, hereinafter referred to, to the tapeholding mechanism 31, hereinafter described.

This tape-holding mechanism 31 comprises a suction plate 32. This suction plate 32 is provided with a number of perforations 33. These perforations communicate with a coupling 34 secured to and carried by the suction plate 32 by means of attachment screws 35.

This coupling 34 has connected thereto one end portion of a flexible conduit 36. This conduit 36 has connection with an elbow 37 which, in turn, has connection with a valve structure 38 of any approved construction. This valve structure 38 is supported from the adjacent side rail 14 by a bracket 39. This valve structure 38 includes a shaft 40 to which is connected as at 41 a handle 42. The handle 42, as shown in Fig. 4, is disposed in valve-opening position.

This valve structure 38 has connection with a flexible conduit 43, and this conduit 43 in turn has connection with a suitable suction pump (not shown) of any approved construction. The arrangement is such that when the suction pump is in operation a suction will be created through the flexible conductor 36 and the suction plate 32 for reasons hereinafter more fully set forth.

This suction plate 32 is formed as an integral part of parallelly extending arms 44. These arms 44 are pivotally connected to the side rails 14 by a transversely extending shaft 46. On this shaft 46 there is mounted a roller 47 over which the web 48 of the tape 129 is passed.

Adjacent the suction plate 32 is the tape-folding mechanism 50. This folding mechanism comprises a mounting plate 51 secured to the side rails 14.

Above the mounting plate 51 and adjacent the suction plate 32 is provided a channel 52 arranged in alignment with the channel 24. This channel 52 is provided by a plate 53 having an upstanding wall 54 spaced from a flexible finger 55 formed as an integral part of a bracket 56. The bracket 56 and plate 53 are connected to the plate 51 by means of screws 57. Provided by the plate 51 in opposed relation with respect to each other, and arranged in pairs, are bearings 58. Journalled in these bearings 58 are stud shafts 59 having head portions 60 urged by springs 61 into bearing engagement with fold blocks 62.

These fold blocks 62 are connected to the plate 51 for lateral adjustment with respect to each other by means of slot and screw connections 63. These fold blocks 62 provide therebetween a channel 64 substantially in alignment with the channel 52. Each block 62 provides upwardly inclined surfaces 65 which cooperate with confronting rollers 66 to fold the longitudinal edge portion of the tape upon the edge portion of the work.

At the entrance of the channel 64 is mounted a roller 64' which engages the taped edge of the work to smoothly press the tape upon such edge as the work is moved over this roller 64'. This roller 64' has trunnions 65' journalled in the bearings 66' provided by the plate 51. The roller 64' is mounted in a slot 67' formed in the plate 51.

The rollers 66 are mounted upon stud shafts 67 which are rotatably carried by mounting brackets 68. These mounting brackets 68 are each formed as an integral part of arms 69 secured as at 70 to the fold blocks 62. The arrangement is such that when the work is brought into engagement with the rollers 66, the work will be guided into the channels 64 between the fold blocks 62, which blocks will fold the longitudinal edge portions of the tape against the adjacent sides of the work.

These fold blocks 62 carry pressure rollers 71 mounted at an inclination with respect to each other so as to present to the work the walls 72 of these rollers, whereby to press the tape firmly against the edge and adjacent side walls of the work. Each of these rollers 71 is rotatably mounted upon a shaft 73 fixed to a block 74 formed as an integral part of the fold block 62.

These rollers 71 are mounted in an opening 75 formed in the plate 51. A channel 76 is arranged in substantial alignment with the channel 64. This channel 76 is provided by the guide walls 77 each having horizontally extending feet 78. These feet 78 are by slot and screw connections 79 secured to a plate 80 in turn secured by bolts 81 to the side rails 14. Arranged in a plane above the channels 19, 24, 64, 76, are guide bars 82 and 82' which are adapted to engage the work a substantial distance above the edge being taped, whereby to hold the work against lateral movement during its movement through the various channels. These guide bars 82 and 82' are supported from the bed plate by means of supporting bars 83. The guide bar 82 comprises a flexible strip 84 normally buckled outwardly from its supporting bar 85 whereby to yieldably bear the work against the bar 82.

In its normal inoperative position, the suction plate 32 is disposed beneath the plate 51 during the passage of the work thereover. In its operative position of presenting the tape for starting attachment to the edge of the work, it is disposed in an elevated position in a plane parallel with the plane of the plate 51. The raising and lowering of this suction plate is accomplished in the following manner:

Formed in the side bars 14, are openings 85' (Fig. 13) in which is journalled a shaft 86. This shaft 86 has fixed thereto retaining collars 87. The shaft 86 provides spaced cut-out portions 88, the bases of which engage the arms 44 of the suction plate 32. The end portion 89 of this shaft 86 is fixedly connected to a link 90 which in turn, is pivotally connected by a link 91 to the lower end portion 92 of the handle 42 as at 93. By pivoting the handle 42 anti-clockwise as viewed in Fig. 4, the shaft 86 will be rotated to bear the cylindrical surfaces thereof against the arms 44, thereby to elevate the suction plate 32 into tape-presenting position. After the tape has been initially attached by adhesion to the edge of the work, the shaft 86 is rotated in an opposite direction to again lower the suction plate 32 by moving the arms 44 thereof into the cut-out portions 88.

Means is provided for severing the tape after the taping operation upon the work. This means comprises a knife 94 which may be a standard, well-known, razor blade. This knife 94 is connected as at 95 to a plate 96 in turn connected as at 97 to a rocker shaft 98 journalled in suitable bearings 99 carried by the bed plate 13.

Fixed to this shaft 98 is an arm 100 connected pivotally by means of links 101 to the plunger 102 of a solenoid 103. This coil is connected in circuit with a suitable power source 104 in the circuit of which is a push-button type switch 105. This switch 105 is mounted upon a bracket 106 in turn connected as at 107 to a laterally extending plate 108 carried by the bed 13. In this plate 108 is provided an elongated notch 109 through which the handle 42 works.

This handle 42 is connected to the shaft 40 of the valve structure 38 for lateral pivotal movement. This is accomplished by a connecting screw 41 which projects through an enlarged opening 110 formed in the handle 42 at its lower end portion. Projecting through an enlarged opening 111 formed in the handle 42 adjacent the opening 110, is a stud 112 on which is mounted a spring 113 which bears against the handle 42 to pivot the same inwardly toward the push button 105.

Communicating with the notch 109 and formed in the plate 108 is a notch 114 into which the handle 42 moves under action of the spring 113, whereby the handle will bear, under action of this spring, against the push button 105 to complete the circuit to the coil of the solenoid 103.

When this coil is energized, the plunger 102 will move upwardly, effecting pivotal movement of the rocker shaft 98 in a clockwise direction, as viewed in Fig. 8, bringing the knife 94 down upon the tape to sever the web from the work.

Carried by one of the side rails 14 and extending downwardly therefrom, is a supporting arm 115 in which there is a suitable bearing 116. Rotatably journalled in this bearing 116 is a shaft 117 on which is threaded a nut 118. This nut 118 connects a drum 119 to the shaft 117 for rotation therewith. On this drum 119 is adapted to be mounted a roll of adhesive tape 120.

Operation

To condition the apparatus for operation, the handle 42 is moved to its extreme rearward position in the notch 109, as shown in Figs. 4 and 6. In this position the valve structure is open to create a suction in the conduit 36 and suction plate 32. The suction plate 32 is disposed below the edge of the plate 51.

The tape employed by me may be of the conventional adhesive type, such for example that known as "pressure adhesive tape." A roll 120 of such tape is mounted upon the drum 119 and the web from the roll is extended over the roller 47 with the end of the web secured by suction to the suction plate 32.

The work W, the edges of which are to be taped, is manually placed edgewise upon the plate 15 in the channels 18 and 24. The work is then manually moved forward through these channels to dispose the leading edge L thereof in substantial alignment with the edge S of the suction plate 32. The work is then tilted by the operator so as to bear the corner C thereof upon that portion of the tape held upon the plate 32 by suction, as shown in Fig. 14A.

After this has been accomplished, the operator moves the handle 42 to its complete forward position in the slot 109 to shut off the valve structure 38 and to effect release from the suction plate of the tape now adhering to the edge of the work W.

The work W is tilted by the operator back in the position shown in Fig. 14B with its edge flatly upon the plate 15. In this position the work is ready to be moved forward through the channel 52 to bring the tape against the fold blocks 62. The movement of the work toward these blocks through the channel 52, draws the tape therewith, and as the work moves between these fold blocks, that part of the web of the tape disposed beyond the side faces of the work will move over the inclined surfaces 65 and be thereby folded against the sides of the work. In this movement of the work between the fold blocks, the work is guided by the guide bars 82 and 82'. The rollers 66 will bear against the folded edge portion of the tape and firmly press such edge portions against the sides of the work.

The work is by the operator moved into the channel 76 with the follow edge L' disposed at the entrance of the channel 52, at which time the work is tilted, as shown in Fig. 14C, to dispose the adjacent edge portion E of the work W within the channels 18 and 24, from which position the work is again moved forward to fold and press the tape upon this edge. This operation continues until all four edge portions of the work W have been covered with the tape.

When the last edge portion of the work W has the tape folded thereon and attached thereto, the work will be disposed in the position shown in Fig. 14D, with the follow edge E' disposed partly within the channel 52. When in this position, the operator moves the handle 42 to a position where, under the action of the spring 113, it will move into the notch 114. In this position of the handle, two things take place simultaneously:

The suction line is open to create a suction through the suction plate to reattach the tape to the suction plate 32. At the same time the handle 42 closes the push button switch 105 to energize the coil of the solenoid 103, projecting the plunger 102 thereof upwardly to effect rocking of the rocker shaft 98 in a direction to bring the knife 94 into cutting position upon the web whereby to sever the web at a point a very short distance from the edge E'.

Following this severing of the web, the handle 42 is moved back into the notch 109 and pivoted to its extreme rear position, in which position the valve structure 38 will remain open to create a suction through the suction plate 32, and the suction plate by rocking of the shaft 89 will move into the position shown in Fig. 14A, in which position the apparatus is again conditioned for the taping of another piece of work. The small length of tape extending beyond the work after the applied tape is severed from the web is, by hand, folded upon the edge E' and pressed and folded thereon. This completes the taping of all the edges of the work.

In order to take up the slack in the web of the tape each time the work is returned to the position shown in Fig. 14C, I mount upon the supporting arm 115 in any suitable manner a spring casing 121. Within this casing 121 I provide a clock spring 122. The shaft 117 has a bifurcation formed therein, and in this bifurcation is fixed one end portion 123 of the clock spring 122. The other end portion 124 of the clock spring carries a leather friction shoe which engages the adjacent wall of the casing 121. The arrangement is such that when the roll 120 is rotated in a clockwise direction as viewed in Fig. 4, the spring 122 will be placed under tension so that when pulling pressure is released from the web 48, the clock spring 122 will serve automatically to rotate the roll 120 in an anticlockwise direction as viewed in Fig. 4, rewrapping the web upon the roll of tape and thus taking the slack from the web during the movement of the work just described.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. For a combination comprising a bed providing aligned channels, means for supporting a roll of adhesive tape for movement by work through said channels, movable means normally spaced below the plane of movement of the work through the channel for releasably holding an end of the tape below said plane for adhesive attachment to said work on which the tape is to be adhesively secured, means for moving said holding means into the plane of movement of the work and for effecting release of the tape from said holding means for movement with the work through said channel, and means for folding the longitudinal edge portions of the tape upon the opposite sides of the work as said work is manually moved through said channels with the tape adhesively secured thereto.

2. For a combination comprising a bed providing aligned channels, means for supporting a roll of adhesive tape for movement by work through said channels, movable suction means normally spaced below the plane of movement of the work through the channel for releasably holding an end of the tape below said plane for adhesive attachment to said work on which the tape is to be adhesively secured, means for moving said suction means into the plane of movement of said work and for effecting release of the tape from said suction means for movement with the work through said channel, and means for folding the longitudinal edge portions of the tape upon the opposite sides of the work as said work is manually moved through said channels with the tape adhesively secured thereto.

3. For a combination comprising a bed providing aligned channels, means for supporting a roll of adhesive tape for movement by work through said channels, suction means for releasably holding an end of the tape for adhesive attachment to said work on which the tape is to be adhesively secured, means for folding the longitudinal edge portions of the tape upon the opposite sides of the work as said work is manually moved through said channels with the tape adhesively secured thereto, and means for controlling the operation of said suction means.

4. For a combination comprising a bed providing aligned channels, means for supporting a roll of adhesive tape for movement by work through said channels, suction means for releasably holding an end of the tape for adhesive attachment to said work on which the tape is to be adhesively secured, means for folding the longitudinal edge portions of the tape upon the opposite sides of the work as said work is manually moved through said channels with the tape adhesively secured thereto, and means for severing the tape from said roll upon completion of the folding operation of said tape upon said work.

5. For a combination comprising a bed providing aligned channels, means for supporting a roll of adhesive tape for movement by work through said channels, suction means for releasably holding an end of the tape for adhesive attachment to said work on which the tape is to be adhesively secured, means for folding the longitudinal edge portions of the tape upon the opposite sides of the work as said work is manually moved through said channels with the tape adhesively secured thereto, and means for severing the tape from said roll upon completion of the folding operation of said tape upon said work.

6. For a combination comprising a bed providing aligned channels, means for supporting a roll of adhesive tape for movement by work through said channels, suction means for releasably holding an end of the tape for adhesive attachment to said work on which the tape is to be adhesively secured, means for folding the longitudinal edge portions of the tape upon the opposite sides of the work as said work is manually moved through said channels with the tape adhesively secured thereto, means for controlling the operation of said suction means, and means for severing the tape from said roll upon completion of the folding operation of said tape upon said work.

7. For a combination comprising a bed plate providing aligned channels, means for supporting a roll of tape from said bed plate, suction means for holding the end of the tape at the entrance of the channels for adhesive attachment to an edge portion of work to be manually moved through said channels, means for folding the web of tape upon said edge portion when the work is moved through said channels, with the tape adhesively secured to the edge of the work, means for discontinuing the operation of said suction means during the movement of the tape through said channel by said work, means for severing the tape at the completion of the folding of the tape on said work, said suction control means being effective to hold the end of the severed tape after said severing operation of the web by said severing means.

8. An apparatus for applying adhesive tape to the edges of a piece of material comprising a bed plate providing a channel through which a strip of tape from a roll of tape is adapted to be moved, means for supporting the roll of tape from said bed plate, suction means at the entrance of said channel for holding an end portion of the strip of tape in position for adhesive connection to the leading edge portion of the material to be taped when said material is placed upon an edge at the entrance of said channel for manual movement therethrough, whereby to unreel the strip of tape from the roll and move the same with said material through the channel, means for folding and pressing the strip of tape upon said edge portion of the material during said movement of the material and strip of tape through the channel, and valve means for breaking the suction during movement of the tape by the material through said channel.

9. An apparatus for applying adhesive tape to the edges of a piece of material comprising a bed plate providing a channel through which a strip of tape from a roll of tape is adapted to be moved, means for supporting the roll of tape from said bed plate, suction means at the entrance of said channel for holding an end portion of the strip of tape in position for adhesive connection to the leading edge portion of the material to be taped when said material is placed upon an edge at the entrance of said channel for manual movement therethrough, whereby to unreel the strip of tape from the roll and move the same with said material through the channel, means for folding and pressing the strip of tape upon said edge portion of the material during said movement of the material and strip of tape through the channel, means for breaking the suction during movement of the tape by the material through said channel, and means for severing said strip of tape from the roll of tape.

10. An apparatus for applying adhesive tape to the edges of a piece of material comprising a bed plate providing a channel through which a strip of tape from a roll of tape is adapted to be moved, means for supporting the roll of tape from said bed plate, suction means at the entrance of said channel for holding an end portion of the strip of tape in position for adhesive connection to the leading edge portion of the material to be taped when said material is placed upon an edge at the entrance of said channel for manual movement therethrough, whereby to unreel the strip of tape from the roll and move the same with said material through the channel, means for folding and pressing the strip of tape upon said edge portion of the material during said movement of the material and strip of tape through the channel, valve means for breaking the suction during movement of the tape by the material through said channel, and means for severing said strip of tape from the roll of tape.

11. An apparatus for applying adhesive tape to the edges of a piece of material comprising a bed plate providing a channel through which a strip of tape from a roll of tape is adapted to be moved, means for supporting the roll of tape from said bed plate, suction means at the entrance of said channel for holding an end portion of the strip of tape in position for adhesive connection to the leading edge portion of the material to be taped, when said material is placed upon an edge at the entrance of said channel for manual movement therethrough, whereby to unreel the strip of tape from the roll and move the same with said material through the channel, means for folding and pressing the strip of tape upon said edge portion of the material during said movement of the material and strip of tape through the channel, means for breaking the suction during movement of the tape by the material through said channel, and means for severing said strip of tape from the roll of tape, said holding means being effective to hold said strip of tape during the tape severing operation.

12. An apparatus for applying adhesive tape to the edges of a piece of material comprising a bed plate providing a channel through which a strip of tape from a roll of tape is adapted to be moved, means for supporting the roll of tape from said bed plate, suction means at the entrance of said channel for holding an end portion of the strip of tape in position for adhesive connection to the leading edge portion of the material to be taped when said material is placed upon an edge at the entrance of said channel for manual movement therethrough, whereby to unreel the strip of tape from the roll and move the same with said material through the channel, means for folding and pressing the strip of tape upon said edge portion of the material during said movement of the material and strip of tape through the channel, valve means for breaking the suction during movement of the tape by the material through said channel, and means for severing said strip of tape from the roll of tape, said suction means being effective to hold said strip of tape during the tape severing operation.

13. An apparatus for applying adhesive tape to the edges of a piece of material comprising a channel through which a strip of tape from a roll of tape is adapted to be moved, means for supporting the roll of tape, suction means at the entrance of said channel for holding an edge portion of the strip of tape in a position to be adhesively secured to the leading edge portion of the material to be taped, when said material is placed upon its edge at the entrance of said channel for manual movement through the channel, whereby to unreel the strip of tape from the roll and move the same with the material through the channel, means for folding the strip of tape upon the opposite sides of the edge portion of the material during movement of the material through the channel, and means for breaking the suction during movement of the tape through said channel by said movement of said material.

14. An apparatus for applying adhesive tape to the edges of a piece of material comprising a channel through which a strip of tape from a roll of tape is adapted to be moved, means for supporting the roll of tape, suction means at the entrance of said channel for holding an edge portion of the strip of tape in a position to be adhesively secured to the leading edge portion of the material to be taped, when said material is placed upon its edge at the entrance of said channel for manual movement through the channel, whereby to unreel the strip of tape from the roll and move the same with the material through the channel, means for folding the strip of tape upon the opposite sides of the edge portion of the material during movement of the material through the channel, means for breaking the suction during movement of the tape through said channel by said movement of said material, and means for severing said strip of tape from said roll.

15. An apparatus for applying adhesive tape to the edges of a piece of material comprising a channel through which a strip of tape from a roll of tape is adapted to be moved, means for supporting the roll of tape, suction means at the entrance of said channel for holding an edge portion of the strip of tape in a position to be adhesively secured to the leading edge portion of the material to be taped, when said material is placed upon its edge at the entrance of said channel for manual movement through the channel, whereby to unreel the strip of tape from the roll and move the same with the material through the channel, means for folding the strip of tape upon the opposite sides of the edge portion of the material during movement of the material through the channel, means for breaking the suction during movement of the tape through said channel by said movement of said material, and means for severing said strip of tape from said roll, said holding means being effective to hold the severed end portion of the strip of tape simultaneously with the severing of the strip of tape from said roll.

16. In a device for use in the adhesive attachment of an edge binding to a shoe platform, a guide engageable with the lateral edges of a precemented strip of edge binding material, a guide for determining the position of the edge face of a platform laterally with respect to said strip, abutments for turning the lateral margins of the strip and holding said margins against the precemented margins of the upper and lower faces of the platform to cause the margins of the strip to adhere to the margins of the platform as the platform is fed under control of the platform guide, and means for insuring against the formation of wrinkles in that portion of the strip which overlies the edge face of the platform while the marginal portions of the strip are being applied to the platform.

CHARLES G. LUCENTI.

REFERENCES CITED

The following references are of record in the file of this patent:

UNITED STATES PATENTS

| Number | Name | Date |
| --- | --- | --- |
| 1,929,137 | Cassegrain | Oct. 3, 1933 |
| 1,956,800 | Jorgensen | May 1, 1934 |
| 2,384,231 | Bamford | Sept. 4, 1945 |